(12) United States Patent
Hemmi et al.

(10) Patent No.: US 6,777,385 B2
(45) Date of Patent: Aug. 17, 2004

(54) LOW-MOLECULAR (METH)ACRYLICACID (SALT)-BASED POLYMER AND ITS PRODUCTION PROCESS AND USES

(75) Inventors: Akiko Hemmi, Osaka (JP); Yoshihiro Maeda, Toride (JP); Shigeru Yamaguchi, Yao (JP); Yoshikazu Fujii, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 195 days.

(21) Appl. No.: 09/887,345

(22) Filed: Jun. 25, 2001

(65) Prior Publication Data

US 2002/0019329 A1 Feb. 14, 2002

(30) Foreign Application Priority Data

Jul. 7, 2000  (JP) ........................................ 2000-206778

(51) Int. Cl.$^7$ .......................... C11D 3/37; C08F 20/06; C08F 2/04
(52) U.S. Cl. .................. 510/477; 510/247; 510/267; 510/361; 510/375; 510/434; 510/476; 510/488; 510/492; 510/533; 252/175; 526/85; 526/86; 526/222; 526/227; 526/229; 526/318.1
(58) Field of Search ................. 510/247, 267, 510/361, 375, 434, 476, 477, 488, 492, 533; 252/175; 526/85, 86, 222, 227, 229, 318.1

(56) References Cited

U.S. PATENT DOCUMENTS

| | | | |
|---|---|---|---|
| 4,774,303 A | 9/1988 | Denzinger et al. | .......... 526/212 |
| 5,055,540 A | 10/1991 | Hughes et al. | |
| 5,294,686 A | 3/1994 | Fiarman et al. | .............. 526/233 |
| 6,130,304 A | 10/2000 | Sumiya et al. | |
| 6,303,711 B1 | 10/2001 | Sumiya et al. | |
| 6,444,771 B1 * | 9/2002 | Yamaguchi et al. | ...... 526/317.1 |
| 2002/0019329 A1 * | 2/2002 | Hemmi et al. | ............... 510/475 |
| 2002/0035224 A1 | 3/2002 | Yamaguchi et al. | |

FOREIGN PATENT DOCUMENTS

| | | | | |
|---|---|---|---|---|
| CN | 1053925 A | 8/1991 | | |
| CN | 1251846 A | 9/1999 | | |
| DE | 197 20 212 A1 | 12/1997 | | |
| EP | 0 014 083 | 8/1980 | | |
| EP | 0 398 724 | 11/1990 | | |
| EP | 398724 | * 11/1990 | ......... | C08F/222/02 |
| EP | 0 969 024 A2 | 1/2000 | | |
| EP | 1170312 | * 1/2002 | ......... | C08F/220/06 |
| JP | 62270605 | 11/1987 | | |
| JP | 4266904 | 9/1992 | | |
| JP | 4268304 | 9/1992 | | |
| JP | 586125 | 4/1993 | | |
| JP | 6287208 | 10/1994 | | |
| JP | 2000-143737 | 5/2000 | | |

* cited by examiner

Primary Examiner—Brian P. Mruk
(74) Attorney, Agent, or Firm—Roylance, Abrams, Berdo & Goodman, L.L.P.

(57) ABSTRACT

A low-molecular (meth)acrylic acid (salt)-based polymer having a good color tone is obtained by polymerizing an aqueous solution of at least one monomer component of a high concentration in the presence of an alkaline substance, wherein: 100 to 95 mol % of the at least one monomer component is a monoethylenically unsaturated monocarboxylic acid (salt) monomer (a) having 3 to 6 carbon atoms; and 0 to 5 mol % of the at least one monomer component is a monoethylenically unsaturated monomer (b) copolymerizable with the monomer (a) (wherein the total of (a) and (b) is 100 mol %); and wherein: a persulfate salt and hydrogen peroxide are used together as polymerization catalysts; and the entirety of the alkaline substance as used is set not to be more than 99 mol % of the amount which is necessary for neutralizing all acid groups of the at least one monomer component; and wherein: the dropwise addition of the hydrogen peroxide is completed at the latest 10 minutes earlier than the completion time of the dropwise addition of the at least one monomer component; and/or the amount of the hydrogen peroxide as added till the initiation of the dropwise addition of the at least one monomer component is kept from exceeding 10% of the entirety of the hydrogen peroxide as added. The resultant polymer is useful for such as detergent compositions and water-treating agents.

15 Claims, No Drawings

LOW-MOLECULAR (METH)ACRYLIC ACID (SALT)-BASED POLYMER AND ITS PRODUCTION PROCESS AND USES

BACKGROUND OF THE INVENTION

A. Technical Field

The present invention relates to: a novel process for obtaining a low-molecular (meth)acrylic acid (salt)-based polymer under high-concentration conditions; the polymer obtained by this process; and uses of this polymer, namely, such as detergent compositions comprising this polymer.

B. Background Art

It has been known well so far that low-molecular acrylic acid-based polymers and so on are very useful for uses such as detergent builders, scale inhibitors, and chelating agents.

And as to production processes for obtaining these low-molecular acrylic acid-based polymers under high-concentration conditions, many production processes are disclosed in such as (I) JP-A-270605/1987, (II) JP-A-086125/1993, (III) JP-A-268304/1992, (IV) JP-A-287208/1994, and (V) JP-A-266904/1992.

In the process disclosed in the above publication (I), (meth)acrylic acid is copolymerized with a copolymerizable ethylenic monomer of a ratio of not more than 10 weight % in a solvent of an alcohol content of not less than 40 weight % in the presence of an inorganic phosphoric acid (salt) of a ratio of 0.01 to 5 weight %.

In the process disclosed in the above publication (II), an aqueous solution of acrylic acid or salt having a pH kept in the range of 6 to 9 is polymerized while nitrogen is introduced into the aqueous solution, thereby obtaining a water-soluble polymer comprising the acrylic acid or salt in a ratio of not less than 95 mol %. The resultant polymer has an average molecular weight of 300 to 10,000 and a dispersion degree of 1.3 to 2.3.

In the process disclosed in the above publication (III), monomers of which the major portion is (meth)acrylic acid are polymerized while being added to a heated aqueous alkali solution together with a peroxide-based polymerization initiator. Set forth in the working-example portion of the publication is an embodiment in which the polymerization is carried out by the steps of initially charging an aqueous sodium hydroxide solution and then heating this solution to 90° C. and then adding drops of the rest of raw materials. If this process is employed, a low-molecular polymer having a number-average molecular weight of 200 to 2,600 can be obtained.

Disclosed in the above publication (IV) is a process for producing a poly(acrylic acid)-based polymer, which process involves aqueous solution polymerization of acrylic acid using hypophosphorous acid or salt as a chain transfer agent. If this process is employed, a polymer having a weight-average molecular weight of not more than 20,000 and a narrow dispersion degree can be obtained.

In the process disclosed in the above publication (V), monomers of which the major portion is (meth)acrylic acid are polymerized in an aqueous solution while the monomers are neutralized with an alkali and while water which is a polymerization medium is distilled off out of the reaction system by evaporation utilizing a heat as generated in the reaction system, thus obtaining the low-molecular (meth) acrylic acid salt-based polymer.

However, even the employment of the above processes has not yet enabled to efficiently produce the low-molecular (meth)acrylic acid (salt)-based polymers under high-concentration conditions.

Specifically, in the case of the art disclosed in the above publication (I), it is necessary to distill off the solvent alcohol at the end of the polymerization, and this distillation not only limits production facilities and apparatuses but also causes a rise of production costs. There are also problems of the below-mentioned eutrophication in that the inorganic phosphoric acid (salt) is used as a polymerization catalyst.

In the case of the art disclosed in the above publication (II), the polymerization is carried out while nitrogen is blown into the solution, but this nitrogen blowing involves scattering of such as monomers, initiators, and chain transfer agents into the air, and therefore causes various problems in aspects of production procedures.

In the case of the art disclosed in the above publication (III), the polymerization is carried out under strong alkaline conditions. In such polymerization in a neutralized state, if the solid content of the reaction system is increased, the viscosity of the aqueous solution of the reaction system greatly rises with the progress of the polymerization, therefore the molecular weight of the resultant polymer tends to greatly increase. In addition, in the working-example portion of the publication, the corrosion is described as not occurring, therefore the details of measures to prevent the corrosion are unclear therefrom, but there are problems in that the measures to prevent the corrosion must always be taken.

In the case of the art disclosed in the above publication (IV), the hypophosphorous acid or salt is used as a chain transfer agent. However, in recent years, the tendency in uses for detergent builders is toward rendering them phosphorus-free in order to prevent eutrophication of rivers and lakes. Therefore, there are problems of being contrary to this tendency.

In the case of the art disclosed in the above publication (V), the polymerization is carried out while water which is a polymerization medium is distilled off by evaporation, and the solid content of the reaction system varies with the amount of water as distilled off, therefore it is difficult to control the polymerization degree or its distribution. In addition, the steps increases by the step of treating the distilled-off water, and further there are limitations in aspects of production facilities and apparatuses because such as recovery facilities are needed.

Besides, there is also a process which involves the use of a sulfite salt as a chain transfer agent. In this process, however, impurities such as mirabilite forms to deteriorate the purity of the resultant polymer. In addition, this process needs facilities for disposing of sulfur dioxide gas generated in the polymerization step, and is therefore limited in aspects of production facilities and apparatuses.

SUMMARY OF THE INVENTION

A. Object of the Invention

The present invention has been made in consideration of the above problems, and its object is to provide a process for efficiently producing a low-molecular (meth)acrylic acid (salt)-based polymer of a good color tone without causing the problems in aspects of production facilities and apparatuses, such as corrosion of apparatuses, and without needing to remove a large amount of alcohols or water, and also without needing to blow nitrogen in, and further, while taking environmental aspects into consideration. Another object of the present invention is to provide favorable uses of the polymer obtained by this process.

B. Disclosure of the Invention

The present inventors diligently studied to solve the above prior art problems. As a result, they have completed the present invention by finding out that the low-molecular (meth)acrylic acid (salt)-based polymer having a good color tone can efficiently be produced under high-concentration conditions, for example, by polymerizing at least one monomer including (meth)acrylic acid in a ratio of not less than 95 mol % under conditions where the neutralization degree is not more than 99 mol % and where hydrogen peroxide and a persulfate salt are used together as initiators, and further by ingeniously controlling the conditions for adding the hydrogen peroxide when this polymerization is carried out.

That is to say, a first production process for a low-molecular (meth)acrylic acid (salt)-based polymer, according to the present invention, comprises the step of polymerizing an aqueous solution of at least one monomer component of a high concentration in the presence of an alkaline substance under conditions where polymerization catalysts are used, wherein: 100 to 95 mol % of the at least one monomer component is a monoethylenically unsaturated monocarboxylic acid (salt) monomer (a) having 3 to 6 carbon atoms; and 0 to 5 mol % of the at least one monomer component is a monoethylenically unsaturated monomer (b) copolymerizable with the monomer (a) (wherein the total of (a) and (b) is 100 mol %); and wherein: a persulfate salt and hydrogen peroxide are used together as the polymerization catalysts; and the entirety of the alkaline substance as used is set not to be more than 99 mol % of the amount which is necessary for neutralizing all acid groups of the at least one monomer component; and the dropwise addition of the hydrogen peroxide is completed at the latest 10 minutes earlier than the completion time of the dropwise addition of the at least one monomer component.

A second production process for a low-molecular (meth) acrylic acid (salt)-based polymer, according to the present invention, comprises the step of polymerizing an aqueous solution of at least one monomer component of a high concentration in the presence of an alkaline substance under conditions where polymerization catalysts are used, wherein: 100 to 95 mol % of the at least one monomer component is a monoethylenically unsaturated monocarboxylic acid (salt) monomer (a) having 3 to 6 carbon atoms; and 0 to 5 mol % of the at least one monomer component is a monoethylenically unsaturated monomer (b) copolymerizable with the monomer (a) (wherein the total of (a) and (b) is 100 mol %); and wherein: a persulfate salt and hydrogen peroxide are used together as the polymerization catalysts; and the entirety of the alkaline substance as used is set not to be more than 99 mol % of the amount which is necessary for neutralizing all acid groups of the at least one monomer component; and the amount of the hydrogen peroxide as added till the initiation of the dropwise addition of the at least one monomer component is kept from exceeding 10% of the entirety of the hydrogen peroxide as added.

In the above production processes according to the present invention, it is allowed to carry out, simultaneously with each other, the following two modes in which: the dropwise addition of the hydrogen peroxide is completed at the latest 10 minutes earlier than the completion time of the dropwise addition of the at least one monomer component; and the amount of the hydrogen peroxide as added till the initiation of the dropwise addition of the at least one monomer component is kept from exceeding 10% of the entirety of the hydrogen peroxide as added.

In the above two processes according to the present invention, the adjustment of the neutralization degree to not more than 99 mol % provides enablement for avoiding the corrosion of production facilities in order to efficiently produce the polymer. In addition, the joint use of the persulfate salt with hydrogen peroxide provides enablement for greatly decreasing the amount of additives in order to favorably produce a low-molecular polymer of high purity. Furthermore, the control of the conditions of the addition of hydrogen peroxide in the above way provides enablement for inhibiting the polymerization termination reaction and obtaining the low-molecular polymer under high-concentration conditions.

In the above processes according to the present invention, it is possible that: when the weight-average molecular weight of the resultant polymer is less than 20,000, the final concentration of the resultant polymer is not less than a value given by multiplying the weight-average molecular weight of the resultant polymer by 0.002; and when the weight-average molecular weight of the resultant polymer is not less than 20,000, the final concentration of the resultant polymer is not less than a square root of a value given by multiplying the weight-average molecular weight of the resultant polymer by 0.08. In other words, the final concentration of the resultant polymer can be a high concentration according to the weight-average molecular weight of the resultant polymer. In addition, it is possible that the final concentration of the resultant polymer is not less than 30 weight %.

In the above processes according to the present invention, if the dispersion degree of the resultant polymer is in the range of 1.5 to 5.0 (wherein the dispersion degree is a quotient given by dividing the weight-average molecular weight by the number-average molecular weight), the above (meth)acrylic acid (salt)-based polymer can most effectively display performances such as dispersibility, chelating ability, and scale inhibitability, and therefore can be used still more favorably for such as detergent builders and scale inhibitors.

In the above processes according to the present invention, if the persulfate salt and hydrogen peroxide are added so that the ratio by weight of the persulfate salt to the hydrogen peroxide maybe in the range of 0.1–5.0, the resultant polymer is inhibited from becoming higher molecular than is necessary.

The above processes according to the present invention provide enablement for obtaining a low-molecular (meth) acrylic acid (salt)-based polymer that is obtained by a process including the step of polymerizing at least one monomer component of which 100 to 95 mol % is a monoethylenically unsaturated monocarboxylic acid (salt) monomer (a) having 3 to 6 carbon atoms, and of which 0 to 5 mol % is a monoethylenically unsaturated monomer (b) copolymerizable with the monomer (a) (wherein the total of (a) and (b) is 100 mol %), wherein: the polymer has a weight-average molecular weight of 1,000 to 30,000 and a dispersion degree of 1.5 to 5.0; and a 40 weight % aqueous solution of the polymer has a hydrogen peroxide content of 5 to 500 ppm and a hazen value of not more than 300. This polymer contains hydrogen peroxide in a ratio of not more than 500 ppm and is therefore a low-molecular polymer having a good color tone.

The present invention provides enablement for obtaining a detergent composition, a water-treating agent, and a pigment dispersant with high performance by defining them as those which comprise the polymer obtained by the above processes according to the present invention.

These and other objects and the advantages of the present invention will be more fully apparent from the following detailed disclosure.

DETAILED DESCRIPTION OF THE INVENTION

A detailed description is hereinafter made about the production process for a low-molecular (meth)acrylic acid (salt)-based polymer, the detergent composition comprising the polymer obtained by this production process, and other uses according to the present invention.

Low-Molecular (Meth)Acrylic Acid (Salt)-Based Polymer

First, a description is made about the low-molecular (meth)acrylic acid (salt)-based polymer which is the aimed product of the production process according to the present invention.

The low-molecular (meth)acrylic acid (salt)-based polymer in the present invention is a polymer obtained by a process including the step of polymerizing at least one monomer component of which 100 to 95 mol % is a monoethylenically unsaturated monocarboxylic acid (salt) monomer (a) having 3 to 6 carbon atoms, and of which 0 to 5 mol % is a monoethylenically unsaturated monomer (b) copolymerizable with the monomer (a) (wherein the total of (a) and (b) is 100 mol %.

This polymer has a weight-average molecular weight in the range of 1,000 to 30,000, favorably 2,000 to 20,000, more favorably 3,000 to 18,000, particularly favorably 5,000 to 15,000. In the case where the weight-average molecular weight is less than 1,000, there are disadvantages in that the chelating ability is low. In the case where the weight-average molecular weight is more than 30,000, there are disadvantages in that the dispersibility is low.

The low-molecular (meth)acrylic acid (salt)-based polymer, according to the present invention, has a dispersion degree in the range of satisfactorily 1.5 to 5.0, favorably 2.0 to 5.0, more favorably 2.0 to 4.0, still more favorably 2.5 to 4.0, and exhibits excellent recontamination inhibitability when used as detergent builders. If the dispersion degree is not less than 1.5, there are advantages in that: the production of the (meth)acrylic acid (salt)-based polymer is not complicated, therefore the productivity is good, and the calcium ion scavengeability is also enhanced. If the dispersion degree is not more than 5.0, there are advantages in that the performances such as calcium ion scavengeability, clay dispersibility, and scale inhibitability are enhanced.

Incidentally, the method for determining the weight-average molecular weight and the molecular weight distribution is explained in the portion hereof under the heading of "DETAILED DESCRIPTION OF THE PREFERRED EMBODIMENTS".

In addition, in the present invention, the wording "(meth) acrylic acid (salt)-based polymer" means that the carboxyl group of the (meth)acrylic acid-based polymer may be any of an acid type, a partial salt type, an entire salt type, and their mixtures. Hereinafter, these partial salt type and entire salt type are referred to simply as (salt). Examples of the salt include: salts of alkaline metals such as sodium and potassium; salts of alkaline earth metals such as calcium and magnesium; ammonium salts; and salts of organic amines such as monoethanolamine and triethanolamine. These salts may be used either alone respectively or in combinations with each other. When the polymer is used as the salt, its favorable forms are the salts of alkaline metals such as sodium and potassium, particularly favorably, sodium salts.

Production Process for Low-molecular (Meth)Acrylic Acid (Salt)-based Polymer

Next, a description is made about the production process for a low-molecular (meth)acrylic acid (salt)-based polymer, wherein this production process is the most important and essential part of the present invention.

In the production process for a low-molecular (meth) acrylic acid (salt)-based polymer according to the present invention, a neutralization degree of not more than 99 mol % of acid is set by uniform-agitation polymerization in an aqueous solvent.

Hereinafter, a specific and more detailed description is made about each constituent of the production process for a low-molecular (meth)acrylic acid (salt)-based polymer according to the present invention.

Specific examples of the monomer (a) include: monoethylenically unsaturated monocarboxylic acid monomers such as acrylic acid, methacrylic acid, crotonic acid, and a-hydroxyacrylic acid; salts obtained by partially or entirely neutralizing the above monoethylenically unsaturated monocarboxylic acid monomers with alkaline metals such as sodium and potassium; salts obtained by partially or entirely neutralizing the above monoethylenically unsaturated monocarboxylic acid monomers with ammonia or organic amines such as monoethanolamine and triethanolamine. The monomer (a) is favorably (meth)acrylic acid (salt) and particularly favorably acrylic acid (salt).

If the monomer (b) is a monoethylenically unsaturated monomer which is copolymerizable with the monomer (a), then the monomer (b) is not especially limited. However, the monomer (b) is favorably a water-soluble monomer, of which the specific examples include: monoethylenically unsaturated dicarboxylic acid monomers such as maleic acid, fumaric acid, and itaconic acid; salts obtained by partially or entirely neutralizing the above monoethylenically unsaturated dicarboxylic acid monomers with alkaline metals such as sodium and potassium; salts obtained by partially or entirely neutralizing the above monoethylenically unsaturated dicarboxylic acid monomers with ammonia or organic amines such as monoethanolamine and triethanolamine; sulfonic-acid-group-containing monoethylenically unsaturated monomers such as vinylsulfonic acid, allylsulfonic acid, and 3-allyloxy-2-hydroxypropanesulfonic acid; salts obtained by partially or entirely neutralizing the above sulfonic-acid-group-containing monoethylenically unsaturated monomers with alkaline metals such as sodium and potassium; salts obtained by partially or entirely neutralizing the above sulfonic-acid-group-containing monoethylenically unsaturated monomers with ammonia or organic amines such as monoethanolamine and triethanolamine; and hydroxyl-group-containing unsaturated monomers such as 3-methyl-2-buten-1-ol (prenol), 3-methyl-3-buten-1-ol (isoprenol), 2-hydroxyacrylate, and 2-hydroxymethylacrylate. More favorable of the above compounds is at least one compound selected from the group consisting of monoethylenically unsaturated dicarboxylic acid monomers, sulfonic-acid-group-containing monoethylenically unsaturated monomers, and partially or entirely neutralized salts thereof.

Method for Adding the Monomers

A description is made below about methods for adding the monomers in the production process for the polymer according to the present invention.

The monomers (a) and (b) are added to the reaction system by substantially continuously dropwise adding not less than 70 weight %, favorably not less than 90 weight %, particularly favorably 100 weight %, of the entirety as used. In the case where the ratio of the dropwise addition is less than 70 weight % (in other words, the amount of initial charge is larger than 30 weight %), there are disadvantages in that, in the initial stage of polymerization, the monomer (a) or (b) might polymerize into block form and further become high molecular, therefore a bad influence is exercised on any of calcium ion scavenge ability, day dispersibility in high-hardness water, and scale inhibitability. The period of time of the dropwise addition of the monomers (a) and (b) is in the range of 30 to 360 minutes, favorably 60 to 240 minutes, particularly favorably 90 to 180 minutes. In the case where the period of time of the dropwise addition is shorter than 30 minutes, there are disadvantages in that the monomers (a) and (b) polymerize into block form. In addition, in the case where the period of time of the dropwise addition is longer than 360 minutes, there are disadvantages in that the process involves not only limitation in aspects of production facilities and apparatuses but also a rise of production costs. In both cases, there are disadvantages in that a bad influence is exercised on calcium ion scavengeability, clay dispersibility in high-hardness water, and scale inhibitability. Incidentally, the neutralization degree is explained below.

Polymerization Initiator

As to the initiator system as used for polymerizing the above monomers (a) and (b) in the present invention, at least one persulfate salt is used together with hydrogen peroxide. In addition, depending on circumstances, chain transfer agents and polyvalent metal ions may be used wherein the polyvalent metal ions serves as decomposition accelerators for the initiators. The chain transfer agent and the polyvalent metal ion may be used simultaneously with each other. Hereinafter, the initiator is specifically explained.

Radical Polymerization Initiator

Specific examples of the above persulfate salt include sodium persulfate, potassium persulfate, and ammonium persulfate. Preferable of them is sodium persulfate.

The amount of the above hydrogen peroxide as added is favorably in the range of 2.0 to 10.0 g more favorably 3.0 to 8.0 g, per mol of the monomers. In the case where the amount of hydrogen peroxide as added is smaller than 2.0 g, the weight-average molecular weight of the resultant (meth) acrylic acid (salt)-based polymer tends to be high. On the other hand, in the case where the amount of hydrogen peroxide as added is larger than 10.0 g, the effects of hydrogen peroxide cannot be obtained so much as to reward the amount of hydrogen peroxide as added, and further there is a bad influence, for example, in that the amount of residual hydrogen peroxide is large.

The amount of the above persulfate salt as added is favorably in the range of 1.0 to 5.0 g, more favorably 2.0 to 4.0 g, per mol of the monomers. In the case where the amount of the persulfate salt as added is smaller than the above range, the molecular weight of the resultant (meth) acrylic acid (salt)-based polymer tends to be high. On the other hand, in the case where the amount of the persulfate salt as added is too large, the effects of the persulfate salt cannot be obtained so much as to reward the amount of the persulfate salt as added, and further there is a bad influence, for example, in that the purity of the resultant (meth)acrylic acid (salt)-based polymer is low.

As to the ratio between the above persulfate salt and the above hydrogen peroxide as added, the weight of the persulfate salt is in the range of favorably 0.1 to 5.0, more favorably 0.5 to 3.0, in terms of weight ratio assuming that the weight of the hydrogen peroxide is 1. In the case where the weight ratio of the persulfate salt is less than 0.1, the weight-average molecular weight of the resultant (meth) acrylic acid (salt)-based polymer tends to also be high. On the other hand, in the case where the weight ratio of the persulfate salt is more than 5.0, the persulfate salt is vainly consumed in the polymerization reaction system in a state where the effects of the addition of the persulfate salt upon lowering the molecular weight cannot be obtained so much as to reward the addition.

In addition, as to the method for adding hydrogen peroxide, relative to the entirety of hydrogen peroxide as used, the amount thereof as substantially continuously dropwise added is favorably not smaller than 85 weight %, particularly favorably not smaller than 90 weight %, of the required predetermined amount, and most favorably the entirety is dropwise added. Hydrogen peroxide is continuously dropwise added, and the dropwise addition rate thereof may be varied.

The dropwise addition of hydrogen peroxide is carried out as follows: under the below-mentioned conditions of polymerization temperature and pH during the polymerization, favorably not larger than 10 weight %, more favorably not larger than 7 weight %, still more favorably not larger than 5 weight %, particularly favorably not larger than 3 weight %, of the required predetermined amount thereof is dropwise added no later than the initiation time of the dropwise addition of the monomers. Furthermore favorably the dropwise addition of hydrogen peroxide is initiated at the same time as the initiation time of the dropwise addition of the monomers, still more favorably in a period of from the initiation time of the dropwise addition of the monomers till 5 to 60 minutes (particularly favorably 10 to 30 minutes) thereafter. In the case where larger than 10 weight % of the required predetermined amount of hydrogen peroxide is dropwise added no later than the initiation time of the dropwise addition of the monomers, the ratio of hydrogen peroxide to the persulfate salt might be so large due to the difference between their decomposition rates as to terminate the polymerization. On the other hand, in the case where the dropwise addition of hydrogen peroxide is initiated later than 60 minutes from the initiation time of the dropwise addition of the monomers, the chain transfer reaction is not caused by the addition of hydrogen peroxide, therefore the molecular weight of the resultant polymer is high from the initial stage of the polymerization.

As to the completion time of the dropwise addition of hydrogen peroxide, the dropwise addition of hydrogen peroxide is completed favorably at the same time as, more favorably at the latest 10 minutes, particularly favorably at the latest 30 minutes, earlier than the completion time of the dropwise addition of the monomers under the below-mentioned conditions of polymerization temperature and pH during the polymerization. Incidentally, even if the dropwise addition of hydrogen peroxide is completed later than the completion time of the dropwise addition of the monomers, a bad influence is not especially exercised on the polymerization system. However, because the added hydrogen peroxide does not entirely decompose no later than the completion of the polymerization, the effects of hydrogen peroxide cannot be obtained and the addition thereof is therefore in vain, and further the amount of residual hydrogen peroxide might be so large as to exercise a bad influence on the thermal stability of the resultant polymer.

In addition, in consideration of such as the decomposing ability of the persulfate salt, the method for adding it is not especially limited. However, relative to the entirety of the persulfate salt as used, the amount thereof as substantially continuously dropwise added is favorably not smaller than 50 weight %, particularly favorably not smaller than 80 weight %, of the required predetermined amount, and most favorably the entirety is dropwise added. The persulfate salt is continuously dropwise added, and the dropwise addition rate thereof may be varied.

The time of the dropwise addition of comparatively fast decomposing initiators such as persulfate salts (e.g. ammonium persulfate, potassium persulfate, and sodium persulfate) is not especially limited, either. However, under the below-mentioned conditions of polymerization temperature and pH during the polymerization, they are dropwise added favorably till the completion time of the dropwise addition of the monomers, and more favorably the dropwise addition of the above initiators is completed within 30 minutes, particularly favorably within 5 to 20 minutes, after the completion of the dropwise addition of the monomers. The effect found as a result of such dropwise addition of the above initiators is that the amount of residual monomers in the resultant polymer can greatly be decreased. Incidentally, even if the dropwise addition of the above initiators is completed before the completion of the dropwise addition of the monomers, a bad influence is not especially exercised on the polymerization, and the completion time of the dropwise addition of the initiators may be set in accordance with the amount of residual monomers in the resultant polymer.

With regard to these comparatively fast decomposing initiators, the favorable ranges are described above about only the completion time of the dropwise addition, but the initiation time of the dropwise addition of these initiators is not limited at all and may fitly be set. For example, depending on circumstances, the dropwise addition of the initiators may be initiated before the initiation of the dropwise addition of the monomers, or particularly in the case of the system of the joint use of the initiators, it is allowed that: the dropwise addition of one initiator is initiated, and then, after a certain time has passed or after this dropwise addition has been completed, the dropwise addition of another initiator is initiated. In any case, the initiation of the dropwise addition of the initiators maybe set according to the decomposition rates of the initiators and the reactivity of the monomers.

When the radical polymerization initiators are added, the concentration thereof is not especially limited, but is favorably in the range of 5 to 60 weight %, particularly favorably 10 to 50 weight %. In the case where the concentration of the initiators is less than 5 weight %, the concentration of the monomers during the polymerization is very low as a result, therefore the polymerizability of the monomers is so much bad that the amount of residual monomers in the resultant polymer is very large. In addition, there are disadvantages also in economical aspects in that the efficiency of such as transportation and the productivity are also low. Or otherwise in the case where the concentration of the initiators is more than 60 weight %, problems take place in aspects of the safety and the easiness of the dropwise addition.

Furthermore, in addition to the above persulfate salt and hydrogen peroxide, other radical polymerization initiators may be used together therewith. Examples of such other radical polymerization initiators include: azo compounds such as 2,2'-azobis(2-amidinopropane) dihydrochloride, 4,4'-azobis-4-cyanovaleric acid, azobisisobutyronitrile, and 2,2'-azobis(4-methoxy-2,4-dimethylvaleronitrile); and organic peroxides such as benzoyl peroxide, lauroyl peroxide, peracetic acid, di-t-butyl peroxide, and cumene hydroperoxide.

Chain Transfer Agent

If necessary, a chain transfer agent may be used as a molecular-weight-adjusting agent for the polymer in combination with the radical polymerization initiators within the range that does not exercise a bad influence on the polymerization. Examples of the chain transfer agent include sulfite salts, bisulfite salts, hypophosphite salts, mercaptopropionic acid, and thioglycolic acid. However, the chain transfer agent is not especially limited. These may be used either alone respectively or in combinations with each other.

The amount of the chain transfer agent as used is favorably within two times as large as that of the initiators in terms of weight ratio. Even if the chain transfer agent is used in an amount larger than two times, the effects of the addition do not emerge any longer, so there are disadvantages in that the purity of the resultant polymer is lowered. In addition, the method for adding the chain transfer agent, or the dropwise addition time of the chain transfer agent if it is dropwise added, is not especially limited, but may be set fitly for circumstances.

Polyvalent Metal Ion

Furthermore, if necessary as the case may be, a polyvalent metal ion maybe used as a decomposition accelerator for the radical polymerization initiators in combination therewith. Examples of usable effective polyvalent metal ions include $Fe^{2+}$, $Fe^{3+}$, $Cu^{2+}$, $Cu^+$, $V^{2+}$, $V^{3+}$, and $VO^{2+}$, and favorable ones are $Fe^{2+}$ and $Fe^{3+}$. These can be used either alone respectively or in combinations with each other.

The method for adding the above polyvalent metal ion is not especially limited, but favorably the polyvalent metal ion is added before the completion of the dropwise addition of the monomers, and particularly favorably the entirety of the polyvalent metal ion is initially charged. In addition, the amount of the polyvalent metal ion as used is favorably not larger than 100 ppm, more favorably not larger than 70 ppm, still more favorably not larger than 50 ppm, particularly favorably not larger than 30 ppm, of the entirety of the reaction liquid. In the case where the amount is larger than 100 ppm, there are disadvantages in that: the effects of the addition are not observed any longer, and the resultant polymer might be so much colored as to be unusable for such as detergent compositions.

The form of supplying the polyvalent metal ion is not especially limited, but any metallic compound or metal can be used if it ionizes in the polymerization reaction system. Examples of such a metallic compound or metal include: water-soluble metal salts such as vanadium oxytrichloride, vanadium trichloride, vanadium oxalate, vanadium sulfate, vanadic anhydride, ammonium metavanadate, ammonium sulfate hypo-vanadious $[(NH_4)_2SO_4 \cdot VSO_4 \cdot 6H_2O]$, ammonium sulfate vanadious $[(NH_4)V(SO_4)_2 \cdot 12H_2O]$, copper(II) acetate, copper(II) bromide, copper(II) acetylacetate, cupric chloride, ammonium cuprous chloride, copper carbonate, copper(II) chloride, copper(II) citrate, copper(II) formate, copper(II) hydroxide, copper nitrate, copper naphthenate, copper(II) oleate, copper maleate, copper phosphate, copper (II) sulfate, cuprous chloride, copper(I) cyanide, copper iodide, copper(I) oxide, copper thiocyanate, iron acetylacetonate, ammonium iron citrate, ammonium ferric oxalate, ammonium ferrous sulfate, ammonium ferric sulfate, iron citrate, iron fumarate, iron maleate, ferrous lactate, ferric nitrate, iron pentacarbonyl, ferric phosphate, and ferric pyrophosphate; metal oxides such as vanadium pentaoxide, copper(II) oxide, ferrous oxide, and ferric oxide; metal sulfides such as copper (II) sulfide and iron sulfide; and copper powder and iron powder. The polyvalent metal ion may be that which elutes from apparatuses.

The monomer composition for polymerization, used in the present invention, comprises the above-mentioned monomers and additives (e.g. polymerization initiators, chain transfer agents, polyvalent metal ions). Incidentally, the monomer composition may further comprise such as additives other than these exemplified additives within the range which does not hinder the polymerization reaction in the present invention or the properties of the resultant water-soluble polymer.

Neutralization Degree in Polymerization and Method for Adjusting this Neutralization Degree The neutralization degree during the polymerization (in other words, during the dropwise addition of the monomers) is not more than 99 mol %, favorably in the range of 50 to 95 mol %, of the total acid amount of the monomers (a) and (b). In the case where the neutralization degree is less than 50 mol %, the decomposition of hydrogen peroxide is not caused enough, therefore the resultant weight-average molecular weight tends to be high. In addition, in the case where the neutralization degree is more than 99 mol %, the system is put under so strong-alkaline and corrosive conditions that the production facilities might corrode at high temperature and further that hydrogen peroxide might be decomposed by the alkali so much that the amount of hydrogen peroxide as added must be increased. After the completion of the polymerization (in other words, after the completion of the dropwise addition of the monomers), the neutralization degree is favorably not less than 80 mol %, more favorably not less than 90 mol %, still more favorably not less than 95 mol %, of the total acid amount of the monomers (a) and (b) in order to promote the decomposition of residual hydrogen peroxide.

Examples of neutralizers for the monomers include: alkaline metal hydroxides such as sodium hydroxide and potassium hydroxide; alkaline earth metal hydroxides such as calcium hydroxide and magnesium hydroxide; ammonia; and organic amines such as monoethanolamine and triethanolamine. These may be used either alone respectively or in combinations with each other. Favorable are the alkaline metal hydroxides such as sodium hydroxide and potassium hydroxide, and particularly favorable is sodium hydroxide. Hereinafter, in the present invention, these are referred to simply as "neutralizers".

The neutralization may be carried out before supplying the monomers to a reactor, or may be carried out in a reactor after supplying the monomers and the neutralizer separately to the reactor. In addition, if the neutralization degree is in the above range, the neutralization degree does not need to be constant from the initiation of the polymerization till the end of the polymerization. Specifically, the neutralization degree may be lowered in the first half of the polymerization, or may be raised in the second half of the polymerization.

When the neutralizer is added, the concentration thereof is not especially limited, but is favorably in the range of 10 to 70 weight %, particularly favorably 30 to 50 weight %. In the case where the concentration of the neutralizer is less than 10 weight %, the concentration of the monomers during the polymerization is very low as a result, therefore the polymerizability of the monomers is so much bad that the amount of residual monomers in the resultant polymer is very large. In addition, there are disadvantages also in economical aspects in that the efficiency of such as transportation and the productivity are also low. Or otherwise in the case where the concentration of the neutralizer is more than 70 weight %, there are disadvantages in aspects of the safety and the easiness of the dropwise addition.

Other Polymerization Conditions

Examples of other polymerization conditions in the present invention production process for the polymer include temperature, concentration, pressure, and solvents during the polymerization. These are specifically explained in order below.

Polymerization Temperature

The temperature during the polymerization is not especially limited at the time of the initial charge, but is favorably not lower than 60° C., more favorably not lower than 90° C., particularly favorably near the boiling point of the polymerization solvent, most favorably the boiling point of the polymerization solvent, from the initiation of the polymerization due to the initiation of the dropwise addition of the monomers or polymerization initiators till the end of the polymerization (namely, the end of the dropwise addition of all of such as monomers and polymerization initiators or, depending on circumstances, the end of the aging time if the aging time is further set after the end of the dropwise addition). In the case where the adjustment of the pH or concentration is carried out after the end of the polymerization, it may fitly be carried out without especial limitation.

In the case where the temperature is lower than 60° C. during the polymerization, there are disadvantages in that the efficiency of decomposition of the polymerization initiators might be so bad that the amount of residual monomers in the resultant polymer is large. In addition, the polymerization at the boiling point has the very great advantage of rendering the control of the temperature so much easy that the reproducibility of the polymerization is good and further that the polymer is obtained very stably in quality. However, in the case where foaming occurs, the polymerization temperature is favorably not higher than the boiling point.

Polymerization Concentration

The final concentration of the resultant polymer is denoted by the following inequalities:

When $Mw<20,000$, $$C \geq A \times Mw$$

When $Mw \geq 20,000$, $$C \geq (B \times Mw)^{1/2}$$

wherein:
C=final concentration of resultant polymer;
A=0.002 and B=0.08, favorably A=0.0025 and B=0.125, more favorably A=0.003 and B=0.18;
Mw=weight-average molecular weight of resultant polymer Or the final concentration of the resultant polymer is favorably not less than 30 weight %, more favorably not less than 33 weight %, still more favorably not less than 35 weight %, yet still more favorably not less than 37 weight %, particularly favorably in the range of 40 to 70 weight %. The concentrations of the materials as dropwise added are adjusted so as to correspond to the above concentration. In the case where the concentration is less than the above range at the end of the polymerization, the concentration during the polymerization is very low as a result, therefore the polymerizability of the monomers is so much bad that the amount of residual monomers in the resultant polymer is very large. In addition, there are disadvantages also in economical aspects in that the efficiency of such as transportation and the productivity are also low. Or otherwise in the case where the concentration is more than 70 weight %, the concentration during the polymerization is very high as a result, therefore the reaction liquid is so much high viscous that the polymerization cannot uniformly be carried out. In addition, a very high molecular polymer might form. Furthermore, a solution of the resultant polymer is so much high viscous that there are disadvantages also in aspects of handling. Incidentally, after the end of the polymerization, the final concentration of the resultant polymer may fitly be adjusted by concentration or dilution.

Polymerization Pressure

The pressure during the polymerization is not especially limited, but maybe any of increased pressure, normal pressure (atmospheric pressure), and reduced pressure, therefore the pressure may fitly be set according to circumstances, but normal pressure is favorable.

Solvent

As to solvents as used in the present invention production process for the polymer, organic solvents may fitly be added in the range which does not exercise a bad influence on the polymerization, if necessary for enhancing the solubility of the monomers (as used for polymerization) into solvents. However, an aqueous solvent is favorable, and favorably not less than 80 weight % of the aqueous solvent is water, and particularly favorably the aqueous solvent is water alone.

Specific examples of the above organic solvents include: lower alcohols such as methanol, ethanol, and isopropyl alcohol; lower ketones such as acetone, methyl ethyl ketone, and diethyl ketone; ethers such as dimethyl ether, diethyl ether, and dioxane; and amides such as dimethylformamide. These can be used either alone respectively or in combinations with each other. Favorably, isopropyl alcohol is used as the solvent. Isopropyl alcohol has effects as a chain transfer agent and therefore can render the molecular weight of the resultant polymer still lower. The above organic solvents may be removed after the end of the polymerization.

The solvent is favorably initially charged in an amount of not smaller than 10 weight %, more favorably not smaller than 12 weight %, particularly favorably not smaller than 15 weight %, of the total of the monomers, the additives (such as neutralizers and polymerization initiators), and the solvent. In the case where the amount of the solvent as initially charged is smaller than 10 weight %, the monomer concentration might be so high at the initiation of the polymerization as to form a high-molecular polymer.

Low-Molecular (Meth)Acrylic Acid (Salt)-Based Polymer having Good Color Tone

The low-molecular (meth)acrylic add (salt)-based polymer having a good color tone in the present invention is a polymer obtained by a process including the step of polymerizing at least one monomer component of which 100 to 95 mol % is a monoethylenically unsaturated monocarboxylic acid (salt) monomer (a) having 3 to 6 carbon atoms, and of which 0 to 5 mol % is a monoethylenically unsaturated monomer (b) copolymerizable with the monomer (a), wherein a 40 weight % aqueous solution of this polymer has a hazen value of not more than 300.

This polymer has a weight-average molecular weight in the range of 1,000 to 30,000, favorably 2,000 to 20,000, more favorably 3,000 to 18,000, particularly favorably 5,000 to 15,000. In the case where the weight-average molecular weight is less than 1,000, there are disadvantages in that the chelating ability is low. In the case where the weight-average molecular weight is more than 30,000, there are disadvantages in that the dispersibility is low.

The above polymer has a dispersion degree in the range of 1.5 to 5.0, favorably 2.0 to 5.0, more favorably 2.0 to 4.0, particularly favorably 2.5 to 4.0, and exhibits excellent recontamination inhibitability when used as detergent builders. In the case where the dispersion degree is less than 1.5, there are disadvantages in that: the production of the (meth) acrylic acid (salt)-based polymer is complicated, therefore the productivity is bad, and the calcium ion scavenge ability is also inferior. In the case where the dispersion degree is more than 5.0, there are disadvantages in that the performances such as calcium ion scavenge ability, day dispersibility, and scale inhibitability are inferior.

The 40 weight % aqueous solution of the above polymer has a hydrogen peroxide content in the range of 5 to 500 ppm, favorably 5 to 300 ppm, more favorably 5 to 200 ppm, particularly favorably 5 to 100 ppm. In the case where the hydrogen peroxide content is less than 5 ppm, there are disadvantages in that the effect on inhibition of the polymer from coloring is not obtained. In the case where the hydrogen peroxide content is more than 500 ppm, there are disadvantages in that problems take place in aspects of safety.

The hazen value is not more than 300, favorably not more than 200, more favorably not more than 100, still more favorably not more than 90, particularly favorably not more than 80. In the case where the hazen value is more than 300, there are disadvantages in that the composition obtained by adding this polymer is much colored.

Incidentally, the method for determining the weight-average molecular weight and the dispersion degree is explained in the portion hereof under the heading of "DETAILED DESCRIPTION OF THE PREFERRED EMBODIMENTS".

Favorable Uses of the Low-molecular (Meth)Acrylic Acid (Salt)-based Polymer Obtained by the Production Process According to the Present Invention Detergent Composition As to the detergent composition according to the present invention, it is favorable that: the combining ratio of the polymer according to the present invention is in the range of 1 to 20 weight % of the entirety of the detergent composition, and the combining ratio of the surfactant is in the range of 5 to 70 weight % of the entirety of the detergent composition. An enzyme may be added in the range of not more than 5 weight % according to circumstances.

In the case where the combining ratio of the polymer according to the present invention is less than 1 weight %, the effect of the addition is not displayed. In addition, in the case where the combining ratio of the polymer according to the present invention is more than 20 weight %, there are disadvantages also in economical aspects in that the effect of the addition does not lead to the enhancement of the detergency any longer. Furthermore, in the case where the amount of the surfactant, which is a main agent of the detergent composition, is outside the above range, there are disadvantages in that the balance between the surfactant and other components might be lost to exercise a bad influence on the detergency of the detergent composition. In the case where the enzyme is added, the enzyme contributes toward enhancing the detergency. However, in the case where the combining ratio of the enzyme is more than 5 weight %, there are disadvantages also in economical aspects in that the effect of the addition is not displayed any longer.

Usable as the surfactant is at least one member selected from the group consisting of anionic surfactants, nonionic surfactants, amphoteric surfactants and cationic surfactants. The anionic surfactant is not especially limited, but examples thereof include alkylbenzenesulfonate salts, alkyl or alkenyl ether sulfate salts, alkyl or alkenyl sulfate salts, α-olefinsulfonate salts, α-sulfofatty acids or ester salts thereof, alkanesulfonate salts, saturated or unsaturated fatty add salts, alkyl or alkenyl ether carboxylate salts, amino acid type surfactants, N-acylamino acid type surfactants, and alkyl or alkenyl phosphate esters or salts thereof.

The nonionic surfactant is not especially limited, but examples thereof include polyoxyalkylene alkyl or alkenyl ethers, polyoxyethylene alkyl phenyl ethers, higher fatty acid alkanolamides or alkylene oxide adducts thereof, sucrose fatty acid esters, alkyl glycoxides, fatty acid glycerol monoesters, and alkylamine oxides.

The amphoteric surfactant is not especially limited, but examples thereof include carboxy type or sulfobetaine type amphoteric surfactants. The cationic surfactant is not especially limited, but examples thereof include quaternary ammonium salts.

Usable examples of the enzyme, which may be combined into the detergent composition according to the present invention, include protease, lipase and cellulase. Particularly, protease, alkali lipase and alkali cellulase are favorable because these exhibit high activity in alkali washing liquids.

If necessary, the detergent composition according to the present invention may further comprise components conventionally used for detergent compositions, such as conventional alkaline builders, chelate builders, re-attachment inhibitors, soil-release agents, dye migration inhibitors, softening agents, fluorescent agents, bleachers, cobleachers and perfumes. In addition, zeolite may be added.

Usable examples of the alkaline builder include silicate salts, carbonate salts and sulfate salts. Examples of the chelate builder, usable if necessary, include diglycolic acid, oxycarboxylate salts, EDTA (ethylenediaminetetraacetic acid), DTPA (diethylenetriaminepentaacetic acid) and citric acid. Or conventional water-soluble poly(carboxylic acid)-based polymers maybe used within the range not damaging the effects of the present invention.

Water-Treating Agent

The water-treating agent favorably consists of the polymer according to the present invention and, if necessary, maybe a composition obtained by combining this polymer with other additives such as polymerized phosphate salts, phosphonate salts, anticorrosive agents, slime-controlling agents, and chelating agents. In any case, this water-treating agent is useful for inhibiting the formation of scale in systems such as cooling water circulation systems, boiler water circulation systems, seawater desalination plants, pulp digesters, and black liquor evaporators. In addition, the water-treating agent may further comprise conventional water-soluble polymers within the range not exercising any influence upon performances or effects.

Pigment Dispersant

The pigment dispersant favorably consists of the polymer according to the present invention and, if necessary, may further contain other additives such as condensed phosphoric acid and any salt thereof, phosphonic acid and any salt thereof, and poly(vinyl alcohol).

In any case, this dispersant exhibits good performance as a dispersant for such as inorganic pigments (e.g. heavy or light calcium carbonate (as used for paper coating) and day). For example, if a small amount of the pigment dispersant according to the present invention is added to an inorganic pigment and then dispersed into water along with the pigment, then high-concentration inorganic pigment slurries such as high-concentration calcium carbonate slurries can be produced wherein the high-concentration inorganic pigment slurries have a low viscosity and a high fluidity, and further, a good stability of these properties over a period of time.

The amount of the pigment dispersant, as used, is favorably in the range of 0.05 to 2.0 weight parts per 100 weight parts of the pigment. In the case where the amount is smaller than 0.05 weight parts, a sufficient dispersing effect cannot be obtained. On the other hand, in the case where the amount is larger than 2.0 weight parts, there might be economical disadvantages in that an effect rewarding the amount of the addition is not obtained any longer.

Fiber-treating Agent

The polymer according to the present invention may be used alone as the fiber-treating agent, but also can be used in the form of a composition further comprising additives such as dyeing agents, peroxides, and surfactants. Examples of the above additive include those which are usually used for conventional fiber-treating agents. The ratio between the polymer according to the present invention and the above additive is not especially limited, but is such that the above additive is added in the ratio of favorably 0.1–100 weight parts, more favorably 0.2–80 weight parts, still more favorably 1–50 weight parts, per 1 weight part of the polymer according to the present invention. In the case where the amount of the above additive is smaller than 0.1 weight part, the effect due to the addition tends to be insufficient. In the case where the amount of the above additive exceeds 100 weight parts, the polymer according to the present invention tends to be unable to exhibit its effects. In addition, the fiber-treating agent, comprising the polymer according to the present invention, may further comprise polymers other than the polymer according to the present invention within the range not hindering the performance or effects of the fiber-treating agent. The content of the polymer according to the present invention in the fiber-treating agent is not especially limited, but is favorably in the range of 1 to 100 weight %, more favorably 5 to 100 weight %, of the entirety of the fiber treating agent.

The fiber for which the fiber-treating agent comprising the polymer according to the present invention can be used is not especially limited. However, examples thereof include: cellulose fibers, such as cotton and hemp; chemical fibers, such as nylon and polyester; animal fibers, such as wool and silk; semisynthetic fibers, such as rayon; and any fabric and blend thereof.

In the case where the fiber-treating agent comprising the polymer according to the present invention is applied to the scouring step, it is favorable that the polymer according to the present invention is mixed with alkali agents and surfactants. For the bleaching step, it is favorable that the polymer according to the present invention is mixed with peroxides and with silicic chemicals, such as sodium silicate, which are used as decomposition inhibitors for alkaline bleachers.

Effects and Advantages of the Invention

In the present invention, the adjustment of the neutralization degree to not more than 99 mol % in the polymerization step provides enablement for avoiding the corrosion of production facilities in order to efficiently produce the low-molecular polymer under high-concentration conditions. In addition, the Joint use of the persulfate salt with hydrogen peroxide provides enablement for greatly decreasing the amount of additives in order to favorably produce a low-molecular polymer of high purity. Furthermore, the definition of the conditions of the addition of hydrogen peroxide provides enablement for inhibiting the polymerization termination reaction and obtaining the low-molecular polymer.

The low-molecular polymer obtained by the process according to the present invention is usable favorably for such as detergent compositions, water-treating agents, and pigment dispersants.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited thereto. Incidentally, hereinafter, the unit "%" denotes "weight %". The measurement methods for the properties are as follows.

Measurement Methods for Properties
Measurement Method for Weight-average Molecular Weight (Mw)

(1) The weight-average molecular weight was measured by GPC (gel permeation chromatography). The column as used for the measurement was GF-7M HQ (made by SHOW A DENKO Corporation). The moving phase thereof was an aqueous solution as prepared by adding pure water to 34.5 g of disodium hydrogenphosphate dodecahydrate and 46.2 g of sodium dihydrogenphosphate dihydrate (both of which were special grade reagents; hereinafter, the reagents as used for the measurement were all special-grade ones) to adjust the entirety to 5,000 g and then filtering the resultant mixture through a membrane filter of 0.45 μm.

(2) The pump as used was L-7110 (made by Hitachi Co., Ltd.). The flow rate of the moving phase was adjusted to 0.5 ml/min. The detector was used at a UV wavelength of 214 nm (Model 481 made by Nippon Waters Co., Ltd.). Then, the column temperature was kept constant at 35° C.

(3) A calibration curve was drawn with poly(sodium acrylate) standard samples (made by Sowa Kagaku Co.).

(4) A 0.1 weight % sample solution was prepared by diluting a sample with the solvent of the moving phase. Then, the weight-average molecular weight of the polymer was measured from the above calibration curve and the sample solution.

Measurement Method for Solid Content (1) About 1 g of sample was placed into an aluminum cup (which had been weighed with the accuracy to 0.1 mg) and then weighed with accuracy.

(2) The aluminum cup resultant from the above step (1) was placed into a drying oven of 110° C. and then dried for 2 hours.

(3) Thereafter, the aluminum cup was transferred into a desiccator and then left cooling at room temperature for 10 minutes and then weighed with accuracy.

(4) The weight of the sample after drying was divided by that before drying, and then the resultant numerical value was multiplied by 100, thus determining the solid content.

Measurement Method for Hydrogen Peroxide Content (1) A Meyer flask of 200 ml in capacity was charged with 2.0 g of potassium iodide, and then thereto 100 ml of pure water was added. Then, the contents of the flask were stirred with a magnetic stirrer. After a solution had been formed, the flask was covered with shading paper.

(2) Then, 30 ml of 9 mol /1 sulfuric acid was added into the flask with a whole pipet.

(3) Next, 5 g of a test sample (polymer) was added into the flask resultant from step (2) above, and then the contents thereof were stirred for 2 minutes.

(4) Then, a 0.01 mol/l aqueous sodium thiosulfate solution was dropwise added until yellow became pale. Furthermore, 1 ml of a 1 % starch solution was added to carry out titration until the iodo-starch color disappeared.

(5) The hydrogen peroxide content was determined from the above measurement result in accordance with the following equation (Equation 1):

$$\text{Hydrogen peroxide content} = ((A-B) \times C \times 0.017)/5.0 \quad \text{(Equation 1)}$$

wherein:
A is a titration amount (ml) in the case where the polymer was added;
B is a titration amount (ml) in the case where the polymer was not added; and
C is a factor of the aqueous sodium thiosulfate solution.

Measurement Method for Hazen Value (1) The hazen value of the aqueous polymer solution was measured with a spectroscopic color difference meter SE-2000 (made by Nippon Denshoku Kogyo Co., Ltd.).

Calcium Ion Scavengeability (1) First, calcium ion standard solutions for drawing a calibration curve were prepared by the following steps of preparing 50 g each of 0.01 mol/l, 0.001 mol/l, and 0.0001 mol/l aqueous solutions of calcium chloride dihydrate, and then adjusting their pH into the range of 9 to 11 with a 4.8% aqueous NaOH solution, and then adding thereto 1 ml of a 4 mol/l aqueous potassium chloride solution (hereinafter, abbreviated as "aqueous 4M-KCl solution"), and then sufficiently stirring the resultant mixture with a magnetic stirrer, thus preparing the sample solutions for drawing the calibration curve. In addition, a needed amount (50 g per sample) of 0.0012 mol/l aqueous solution was prepared as a test calcium ion standard solution from the same calcium chloride dihydrate as the above.

(2) Next, 10 mg (in terms of solid content) of a test sample (polymer) was weighed out into a beaker of 100 cc, and then thereto 50 g of the test calcium ion standard solution as prepared in step (1) above was added, and then the contents of the beaker were stirred with a magnetic stirrer enough. Furthermore, similarly to the sample solutions for drawing the calibration curve, the pH of the resultant mixture was adjusted into the range of 9 to 11 with a 4.8%. aqueous NaOH solution, and then thereto 1 ml of the aqueous 4M-KCl solution was added, thus preparing a test sample solution.

(3) The sample solutions for drawing the calibration curve and the test sample solution, as prepared in the above ways, were measured with a calcium ion electrode 93-20 (made by OLION Co.) using an ion analyzer EA920 (made by OLION Co.).

(4) The amount of calcium ion, as scavenged by the sample (polymer), was determined by calculation from the calibration curve and the measured value of the test sample solution. Then, the determined amount per g of the solid content of the polymer was denoted by the grams in terms of calcium carbonate, and its value was regarded as the calcium ion scavengeability value.

Clay Dispersibility in High-Hardness Water (1) First, a glycine buffer was prepared by adding ion-exchanged water to 67.56 g of glycine, 52.6 g of sodium chloride, and 60 ml of 1 mol/l aqueous NaOH solution to adjust the total weight to 600 g.

(2) A dispersion was prepared by weighing out 0.3268 g of calcium chloride dihydrate and 60 g of the glycine buffer, as prepared in step (1) above, and then adding thereto pure water to adjust the total weight to 1,000 g. In addition, an aqueous polymer solution of 0.1% in terms of solid content was prepared.

(3) Next, 0.3 g of day of 8 types of JIS test dust I (Kanto loam, fine particles; available from Japan Powder Industrial Technical Society) was placed into a general test tube of about 30 cc as used for experiments. Thereto, 27 g of the dispersion and 3 g of the aqueous polymer solution, as prepared in step (2) above, were added, thus obtaining a test liquid, of which the calcium concentration was 200 ppm in terms of calcium carbonate.

(4) The test tube was sealed with a parafilim, and then shaken gently so that the day would be dispersed into the entirety of the test liquid. Thereafter, the test tube was further shaken up and down 20 times. The test tube was then allowed to stand stationary for 20 hours in a place as not exposed to direct sunlight. Thereafter, 5 ml of supernatant of the dispersion was sampled with a whole pipet.

(5) The absorbance (ABS) of the sampled liquid was measured with a cell of 1 cm under conditions of wave length=380 nm using a UV spectroscope, and the resultant value was regarded as the clay dispersibility value in high-hardness water.

Next, an explanation is made about specific examples of some preferred embodiments of the present invention.

EXAMPLE 1—1

First, 193.0 g of ion-exchanged water (hereinafter, referred to as pure water) was initially charged into a SUS-made separable flask of 2.5 liters in capacity as fitted with a thermometer, a stirrer and a reflux condenser. The pure water was then heated so as to fall into a boiling point reflux state while being stirred. Thereafter, while the reflux state was maintained under stirred conditions, the following materials were dropwise added continuously at constant rates from their respective separate dropping nozzles: 450.0 g of 80% aqueous acrylic acid solution (hereinafter, referred to as 80% AA) over a period of 180 minutes from the initiation of the polymerization; 114.3 g of 35% aqueous hydrogen peroxide solution (hereinafter, referred to as 35 % $H_2O_2$) over a period of 60 minutes from the initiation of the polymerization; 133.3 g of 15% aqueous sodium persulfate solution (hereinafter, abbreviated as 15% NAPS) over a period of 190 minutes from the initiation of the polymerization; and 333.3 g of 48% aqueous sodium hydroxide solution (hereinafter, referred to as 48% NaOH) over a period of 180 minutes from the initiation of the polymerization. Thereafter, the boiling point reflux state was maintained over a period of 20 minutes from the end of all the dropwise additions, thus completing the polymerization.

With the boiling point reflux state being left maintained for 30 minutes after the completion of the polymerization, 62.5 g of 48% NaOH was dropwise added gradually to the reaction solution under stirred conditions to carry out neutralization, thus obtaining a poly(sodium acrylate) 1—1 (hereinafter, referred to as polymer 1—1) having a solid content of 39.5% and a final neutralization degree of 95%. The resultant polymer 1—1 was measured by the weight-average molecular weight Mw, the hydrogen peroxide content, the hazen value, the calcium ion scavengeability, and the clay dispersibility. The results are listed in Table 1.

EXAMPLE 1–2

Polymerization was carried out in the same way as of Example 1—1 except that the amount of the 35% $H_2O_2$ as added was changed to 57.1 g. Thereafter, with the boiling point reflux state being left maintained for 30 minutes, 62.5 g of 48% NaOH was dropwise added gradually to the reaction solution under stirred conditions to carry out neutralization, thus obtaining a poly(sodium acrylate) 1–2 (hereinafter, referred to as polymer 1–2) having a solid content of 41.5% and a final neutralization degree of 95%. The resultant polymer 1–2 was measured by the weight-average molecular weight Mw, the hydrogen peroxide content, the hazen value, the calcium ion scavengeability, and the clay dispersibility. The results are listed in Table 1.

EXAMPLE 1–3

Polymerization was carried out in the same way as of Example 1–2 except that the 35 % $H_2O_2$ was dropwise added continuously at a constant rate over a period of 90 minutes from the initiation of the polymerization. Thereafter, with the boiling point reflux state being left maintained for 30 minutes, 62.5 g of 48% NaOH was dropwise added gradually to the reaction solution under stirred conditions to carry out neutralization, thus obtaining a poly(sodium acrylate) 1–3 hereinafter, referred to as polymer 1–3) having a solid content of 41.7% and a final neutralization degree of 95%. The resultant polymer 1–3 was measured by the weight-average molecular weight Mw, the hydrogen peroxide content, the hazen value, the calcium ion scavengeability, and the day dispersibility. The results are listed in Table 1.

EXAMPLE 1–4

Polymerization was carried out in the same way as of Example 1—1 except that the amount of the 35% $H_2O_2$ as dropwise added was changed to 85.7 g and that the 35% $H_2O_2$ was dropwise added continuously at a constant rate over a period of 150 minutes from the initiation of the polymerization. Thereafter, with the boiling point reflux state being left maintained for 30 minutes, 62.5 g of 48% NaOH was dropwise added gradually to the reaction solution under stirred conditions to carry out neutralization, thus obtaining a poly(sodium acrylate) 1–4 (hereinafter, referred to as polymer 1–4) having a solid content of 40.5% and a final neutralization degree of 95%. The resultant polymer 1–4 was measured by the weight-average molecular weight Mw, the hydrogen peroxide content, the hazen value, the calcium ion scavengeability, and the clay dispersibility. The results are listed in Table 1.

EXAMPLE 1–5

Polymerization was carried out in the same way as of Example 1–4 except that the amount of the 35% $H_2O_2$ as dropwise added was changed to 68.6 g. Thereafter, with the boiling point reflux state being left maintained for 30 minutes, 62.5 g of 48% NaOH was dropwise added gradually to the reaction solution under stirred conditions to carry out neutralization, thus obtaining a poly(sodium acrylate) 1–5 (hereinafter, referred to as polymer 1–5) having a solid content of 41.0% and a final neutralization degree of 95%. The resultant polymer 1–5 was measured by the weight-average molecular weight Mw, the hydrogen peroxide content, the hazen value, the calcium ion scavengeability, and the day dispersibility. The results are listed in Table 1.

EXAMPLE 1–6

Polymerization was carried out in the same way as of Example 1–5 except that the amount of the 48% NaOH as dropwise added was changed to 375.0 g. Thereafter, with the boiling point reflux state being left maintained for 30 minutes, 20.8 g of 48% NaOH was dropwise added gradually to the reaction solution under stirred conditions to carry out neutralization, thus obtaining a poly(sodium acrylate) 1–6 (hereinafter, referred to as polymer 1–6) having a solid content of 41.3% and a final neutralization degree of 95%. The resultant polymer 1–6 was measured by the weight-average molecular weight Mw, the hydrogen peroxide content, the hazen value, the calcium ion scavengeability, and the day dispersibility. The results are listed in Table 1.

EXAMPLE 1–7

Polymerization was carried out in the same way as of Example 1–6 except that the amount of the 35% $H_2O_2$ as dropwise added was changed to 114.3 g. Thereafter, with the boiling point reflux state being left maintained for 30 minutes, 20.8 g of 48% NaOH was dropwise added gradually to the reaction solution under stirred conditions to carry out neutralization, thus obtaining a poly(sodium acrylate) 1–7 (hereinafter, referred to as polymer 1–7) having a solid content of 39.9% and a final neutralization degree of 95%. The resultant polymer 1–7 was measured by the weight-average molecular weight Mw, the hydrogen peroxide content, the hazen value, the calcium ion scavengeability, and the clay dispersibility. The results are listed in Table 1.

EXAMPLE 1–8

Polymerization was carried out in the same way as of Example 14 except that the amount of the 15% NaPS as dropwise added was changed to 83.3 g and that the amount of the 48% NaOH as dropwise added was changed to 375.0 g. Thereafter, with the boiling point reflux state being left maintained for 30 minutes, 20.8 g of 48% NaOH was dropwise added gradually to the reaction solution under stirred conditions to carry out neutralization, thus obtaining a poly(sodium acrylate) 1–8 (hereinafter, referred to as polymer 1–8) having a solid content of 42.1% and a final neutralization degree of 95%. The resultant polymer 1–8 was measured by the weight-average molecular weight Mw, the hydrogen peroxide content, the hazen value, the calcium ion scavengeability, and the clay dispersibility. The results are listed in Table 1.

EXAMPLE 1–9

First, 195.9 g of pure water was initially charged into a SUS-made separable flask of 2.5 liters in capacity as fitted with a thermometer, a stirrer and a reflux condenser. The pure water was then heated so as to fall into a boiling point reflux state while being stirred. Thereafter, while the reflux state was maintained under stirred conditions, the following materials were dropwise added continuously at constant rates from their respective separate dropping nozzles: 260.9 g of 80% AA over a period of 175 minutes from 5 minutes later than the initiation of the polymerization; 533.8 g of 37% aqueous sodium acrylate solution (hereinafter, referred to as 37% SA) over a period of 150 minutes from 30 minutes later than the initiation of the polymerization; 54.9 g of 35% $H_2O_2$ over a period of 150 minutes from the initiation of the polymerization; 106.7 g of 15% NaPS over a period of 190 minutes from the initiation of the polymerization; and 200.0 g of 48% NaOH over a period of 180 minutes from 5 minutes later than the initiation of the polymerization; thus completing the polymerization.

With the boiling point reflux state being left maintained for 30 minutes after the completion of the polymerization, 20.8 g of 48% NaOH was dropwise added gradually to the reaction solution under stirred conditions to carry out neutralization. Thereafter, while the boiling point reflux state was maintained for 60 minutes, the reaction solution was concentrated, thus obtaining a poly(sodium acrylate) 1–9 (hereinafter, referred to as polymer 1–9) having a solid content of 40.0% and a final neutralization degree of 95%. The resultant polymer 1–9 was measured by the weight-average molecular weight Mw, the hydrogen peroxide content, the hazen value, the calcium ion scavengeability, and the clay dispersibility. The results are listed in Table 1.

EXAMPLE 1–10

First, 231.3 g of pure water was initially charged into a SUS-made separable flask of 2.5 liters in capacity as fitted with a thermometer, a stirrer and a reflux condenser. The pure water was then heated so as to fall into a boiling point reflux state while being stirred. Thereafter, while the reflux state was maintained under stirred conditions, the following materials were dropwise added continuously at constant rates from their respective separate dropping nozzles: 450.0 g of 80% AA over a period of 235 minutes from 5 minutes later than the initiation of the polymerization; 61.1 g of 35% $H_2O_2$ over a period of 180 minutes from the initiation of the polymerization; 106.7 g of 15% NaPS over a period of 250 minutes from the initiation of the polymerization; and 375.0 g of 48% NaOH over a period of 235 minutes from 5 minutes later than the initiation of the polymerization; thus completing the polymerization.

With the boiling point reflux state being left maintained for 30 minutes after the completion of the polymerization, 20.8 g of 48% NaOH was dropwise added gradually to the reaction solution under stirred conditions to carry out neutralization. Thereafter, the boiling point reflux state was maintained for 90 minutes, thus obtaining a poly(sodium acrylate) 1–10 (hereinafter, referred to as polymer 1–10) having a solid content of 40.1% and a final neutralization degree of 95%. The resultant polymer 1–10 was measured by the weight-average molecular weight Mw, the hydrogen peroxide content, the hazen value, the calcium ion scavengeability, and the lay dispersibility. The results are listed in Table 1.

EXAMPLE 1–11

First, 272.3 g of pure water was initially charged into a SUS-made separable flask of 2.5 liters in capacity as fitted with a thermometer, a stirrer and a reflux condenser. The pure water was then heated so as to fall into a boiling point reflux state while being stirred. Thereafter, while the reflux state was maintained under stirred conditions, the following materials were dropwise added continuously at constant rates from their respective separate dropping nozzles: 450.0 g of 80% AA over a period of 240 minutes from the initiation of the polymerization; 57.2 g of 35% $H_2O_2$ over a period of 185 minutes from 15 minutes later than the initiation of the polymerization; 83.3 g of 15% NaPS over a period of 250 minutes from the initiation of the polymerization; and 375.0 g of 48% NaOH over a period of 240 minutes from the initiation of the polymerization; thus completing the polymerization.

With the boiling point reflux state being left maintained for 30 minutes after the completion of the polymerization, 25.0 g of 48% NaOH was dropwise added gradually to the reaction solution under stirred conditions to carry out neutralization. Thereafter, the boiling point reflux state was maintained for 90 minutes, thus obtaining a poly(sodium acrylate) 1–11 (hereinafter, referred to as polymer 1–11) having a solid content of 39.6% and a final neutralization degree of 96%. The resultant polymer 1–11 was measured by the weight-average molecular weight Mw, the hydrogen peroxide content, the hazen value, the calcium ion scavengeability, and the lay dispersibility. The results are listed in Table 1.

EXAMPLE 1–12

First, 258.8 g of pure water was initially charged into a SUS-made separable flask of 2.5 liters in capacity as fitted with a thermometer, a stirrer and a reflux condenser. The pure water was then heated so as to fall into a boiling point reflux state while being stirred. Thereafter, while the reflux state was maintained under stirred conditions, the following materials were dropwise added continuously at constant rates from their respective separate dropping nozzles: 450.0 g of 80% AA over a period of 240 minutes from the initiation of the polymerization; 58.9 g of 35% $H_2O_2$ over a period of 165 minutes from 15 minutes later than the initiation of the polymerization; 102.8 g of 15% NAPS over a period of 250 minutes from the initiation of the polymerization; and 375.0 g of 48% NaOH over a period of 240 minutes from the initiation of the polymerization; thus completing the polymerization.

With the boiling point reflux state being left maintained for 30 minutes after the completion of the polymerization, 25.0 g of 48% NaOH was dropwise added gradually to the reaction solution under stirred conditions to carry out neutralization. Thereafter, the boiling point reflux state was maintained for 90 minutes, thus obtaining a poly(sodium acrylate) 1–12 (hereinafter, referred to as polymer 1–12) having a solid content of 39.6% and a final neutralization degree of 96%. The resultant polymer 1–12 was measured by the weight-average molecular weight Mw, the hydrogen peroxide content, the hazen value, the calcium ion scavengeability, and the clay dispersibility. The results are listed in Table 1.

EXAMPLE 1–13

First, 1,384.8 g of pure water was initially charged into a SUS-made separable flask of 2.5 liters in capacity as fitted with a thermometer, a stirrer and a reflux condenser. The pure water was then heated so as to fall into a boiling point reflux state while being stirred. Thereafter, while the reflux state was maintained under stirred conditions, the following materials were dropwise added continuously at constant rates from their respective separate dropping nozzles: 450.0 g of 80% AA over a period of 235 minutes from 5 minutes later than the initiation of the polymerization; 61.1 g of 35% $H_2O_2$ over a period of 180 minutes from the initiation of the polymerization; 106.7 g of 15% NaPS over a period of 250 minutes from the initiation of the polymerization; and 375.0 g of 48% NaOH over a period of 235 minutes from 5 minutes later than the initiation of the polymerization; thus completing the polymerization.

With the boiling point reflux state being left maintained for 30 minutes after the completion of the polymerization, 25.0 g of 48% NaOH was dropwise added gradually to the reaction solution under stirred conditions to carry out neutralization. Thereafter, the boiling point reflux state was maintained for 90 minutes, thus obtaining a poly(sodium acrylate) 1–13 (hereinafter, referred to as polymer 1–13) having a solid content of 20.6% and a final neutralization degree of 96 %. The resultant polymer 1–13 was measured by the weight-average molecular weight Mw, the hydrogen peroxide content, the hazen value, the calcium ion scavengeability, and the clay dispersibility. The results are listed in Table 1.

EXAMPLE 1–14

First, 179.1 g of pure water was initially charged into a SUS-made separable flask of 2.5 liters in capacity as fitted with a thermometer, a stirrer and a reflux condenser. The pure water was then heated so as to fall into a boiling point reflux state while being stirred. Thereafter, while the reflux state was maintained under stirred conditions, the following materials were dropwise added continuously at constant rates from their respective separate dropping nozzles: 418.5 g of 80% AA over a period of 175 minutes from 5 minutes later than the initiation of the polymerization; 89.2 g of 37% SA over a period of 175 minutes from 5 minutes later than the initiation of the polymerization; 68.6 g of 35% $H_2O_2$ over a period of 120 minutes from the initiation of the polymerization; 133.3 g of 15% NaPS over a period of 190 minutes from the initiation of the polymerization; and 262.4 g of 48% NaOH over a period of 175 minutes from 5 minutes later than the initiation of the polymerization; thus completing the polymerization.

With the boiling point reflux state being left maintained for 30 minutes after the completion of the polymerization, 104.2 g of 48% NaOH was dropwise added gradually to the reaction solution under stirred conditions to carry out neutralization. Thereafter, the boiling point reflux state was maintained for 60 minutes, thus obtaining a poly(sodium acrylate) 1–14 (hereinafter, referred to as polymer 1–14) having a solid content of 40.1% and a final neutralization degree of 95%. The resultant polymer 1–14 was measured by the weight-average molecular weight Mw, the hydrogen peroxide content, the hazen value, the calcium ion scavengeability, and the clay dispersibility. The results are listed in Table 1.

EXAMPLE 1–15

First, 231.8 g of pure water was initially charged into a SUS-made separable flask of 2.5 liters in capacity as fitted with a thermometer, a stirrer and a reflux condenser. The pure water was then heated so as to fall into a boiling point reflux state while being stirred. Thereafter, with the temperature of the pure water being left maintained at 98° C. under stirred conditions, the following materials were dropwise added continuously at constant rates from their respective separate dropping nozzles: 450.0 g of 80% AA over a period of 175 minutes from 5 minutes later than the initiation of the polymerization; 85.7 g of 35% $H_2O_2$ over a period of 120 minutes from the initiation of the polymerization; 66.7 g of 15% NaPS over a period of 190 minutes from the initiation of the polymerization; and 375.0 g of 48% NaOH over a period of 175 minutes from 5 minutes later than the initiation of the polymerization; thus completing the polymerization.

With the temperature of the reaction solution being left maintained at 98° C. for 30 minutes after the completion of the polymerization, 20.8 g of 48% NaOH was dropwise added gradually to the reaction solution under stirred conditions to carry out neutralization. Thereafter, the resultant solution was heated so as to fall into a boiling point reflux state, and this boiling point reflux state was maintained for 60 minutes, thus obtaining a poly(sodium acrylate) 1–15 (hereinafter, referred to as polymer 1–15) having a solid content of 40.3% and a final neutralization degree of 95%. The resultant polymer 1–15 was measured by the weight-average molecular weight Mw, the hydrogen peroxide content, the hazen value, the calcium ion scavengeability, and the clay dispersibility. The results are listed in Table 1.

Incidentally, the reaction conditions in the above Examples are compiled in Table 2.

TABLE 1

| Example | Weight-average molecular weight Mw | Dispersion degree Mw/Mn | $H_2O_2$ content (ppm) | Hazen value | Calcium ion scavengeability | Clay dispersibility |
|---|---|---|---|---|---|---|
| 1-1 | 7,200 | 2.6 | 250 | 95 | 230 | 0.54 |
| 1-2 | 14,000 | 4.4 | 260 | 70 | 270 | 0.50 |
| 1-3 | 15,000 | 4.7 | 480 | 60 | 260 | 0.49 |
| 1-4 | 9,600 | 3.8 | 450 | 100 | 250 | 0.47 |
| 1-5 | 11,000 | 3.3 | 280 | 80 | 260 | 0.49 |
| 1-6 | 11,000 | 3.4 | 500 | 55 | 260 | 0.47 |

TABLE 1-continued

| Example | Weight-average molecular weight Mw | Dispersion degree Mw/Mn | H$_2$O$_2$ content (ppm) | Hazen value | Calcium ion scavenge-ability | Clay dis-persibility |
|---|---|---|---|---|---|---|
| 1-7 | 10,000 | 3.3 | 480 | 80 | 260 | 0.55 |
| 1-8 | 11,000 | 2.6 | 260 | 80 | 270 | 0.55 |
| 1-9 | 11,000 | 2.6 | 180 | 30 | 270 | 0.54 |
| 1-10 | 9,800 | 2.5 | 170 | 80 | 270 | 0.55 |
| 1-11 | 9,300 | 2.5 | 40 | 20 | 270 | 0.56 |
| 1-12 | 8,800 | 2.7 | 10 | 100 | 260 | 0.56 |
| 1-13 | 2,100 | 1.9 | 10 | 100 | 210 | 0.60 |
| 1-14 | 11,000 | 2.6 | 160 | 40 | 270 | 0.54 |
| 1-15 | 11,000 | 2.4 | 210 | 20 | 270 | 0.56 |

TABLE 2

| Example | Amount of dropwise addition | | | | |
|---|---|---|---|---|---|
| | 80% AA g (mol) | 37% SA g (mol) | 15% NaPS g (g/mol) | 35% H$_2$O$_2$ g (g/mol) | 48% NaOH g (mol) |
| 1-1 | 450 (5.0) | 0 (0) | 133.3 (4.0) | 114.3 (8.0) | 333.3 (4.0) |
| 1-2 | 450 (5.0) | 0 (0) | 133.3 (4.0) | 57.1 (4.0) | 333.3 (4.0) |
| 1-3 | 450 (5.0) | 0 (0) | 133.3 (4.0) | 57.1 (4.0) | 333.3 (4.0) |
| 1-4 | 450 (5.0) | 0 (0) | 133.3 (4.0) | 85.7 (6.0) | 333.3 (4.0) |
| 1-5 | 450 (5.0) | 0 (0) | 133.3 (4.0) | 68.6 (4.8) | 333.3 (4.0) |
| 1-6 | 450 (5.0) | 0 (0) | 133.3 (4.0) | 68.6 (4.8) | 375.0 (4.5) |
| 1-7 | 450 (5.0) | 0 (0) | 133.3 (4.0) | 114.3 (8.0) | 375.0 (4.5) |
| 1-8 | 450 (5.0) | 0 (0) | 83.3 (2.5) | 85.7 (6.0) | 375.0 (4.5) |
| 1-9 | 260.9 (2.9) | 533.8 (2.1) | 106.7 (3.2) | 54.9 (3.8) | 200.0 (2.4) |
| 1-10 | 450 (5.0) | 0 (0) | 106.7 (3.2) | 61.1 (4.3) | 375.0 (4.5) |
| 1-11 | 450 (5.0) | 0 (0) | 83.3 (2.5) | 57.2 (4.0) | 375.0 (4.5) |
| 1-12 | 450 (5.0) | 0 (0) | 102.8 (3.1) | 58.9 (4.1) | 375.0 (4.5) |
| 1-13 | 450 (5.0) | 0 (0) | 106.7 (3.2) | 61.1 (4.3) | 375.0 (4.5) |
| 1-14 | 418.5 (4.7) | 89.2 (0.35) | 133.3 (4.8) | 68.6 (4.0) | 262.4 (3.15) |
| 1-15 | 450 (5.0) | 0 (0) | 66.7 (2.0) | 85.7 (6.0) | 375.0 (4.5) |

As is evident from the results of Table 1, all the polymers 1—1 to 1–15 according to the present invention have weight-average molecular weight of not more than 20,000, so it has been found that polymers having low molecular weights and good dispersion degrees can be obtained by one-step polymerization even under high-concentration conditions. In addition, the aqueous solutions of the polymers have hazen values of not more than 300, so it has been found that polymers having very good color tones can be obtained.

Hereinafter, the recontamination inhibitabilities of the polymers according to the present invention, as obtained in Examples 1—1 to 1-15, were measured by the below-mentioned process so that the polymers might be evaluated on the use thereof as detergent compositions. The results are collectively shown in Table 3.

Recontamination Inhibitability (1) Cotton cloth according to JIS-L0803, obtained from the Japanese Laundry Research Association, was cut into pieces of 5 cm×5 cm to prepare white cloth. The whiteness degree of this white cloth was beforehand measured by the reflectance with a calorimetric color difference meter, ND-1001DP model, made by Nippon Denshoku Kogyo Co., Ltd.

(2) Hard water was prepared by adding pure water to 0.294 g of calcium chloride dihydrate to adjust the total weight to 5,000 g. This hard water and tap water for rinsing were immersed into a thermostat of 25° C.

(3) A Terg-O-Tometer was set to 25° C., and then 1 liter of the above hard water and 1 g of clay were placed into a pot of the Terg-O-Tometer and then stirred at 100 rpm for 1 minute. Thereafter, ten pieces of the white cloth were added, and then the contents of the pot were stirred at 100 rpm for 1 minute.

(4) Into the above pot, 4 g of 5% aqueous sodium carbonate solution, 4 g of 5% aqueous sodium linear-chain-alkylbenzenesulfonate (hereinafter, abbreviated as LAS) solution, 0.15 g of zeolite and 5 g of aqueous polymer solution of 1% in terms of solid content were added, and then the contents of the pot were stirred at 100 rpm for 10 minutes.

(5) Water was drained off from the white cloth by hand, and then 1 liter of the tap water as adjusted to 25° C. in the above way was placed into the pot, and then its contents were stirred at 100 rpm for 2 minutes. This step was twice carried out.

(6) The above steps (3) to (5) were thrice repeated.

(7) The white cloth was dried while its wrinkles were ironed out with the white cloth covered by other cloth, and then the whiteness degree of the dried white cloth was measured by the reflectance with the above colorimetric color difference meter again.

(8) The recontamination-inhibiting ratio was calculated from the above measurement results in accordance with the following equation (Equation 2):

Recontamination-inhibiting ratio (%)=(whiteness degree after washing)/(whiteness degree of original white cloth)(Equation 2)

TABLE 3

| Use Example | Polymer | Recontamination inhibitability (%) |
|---|---|---|
| 2-1 | 1-1 | 98.3 |
| 2-2 | 1-2 | 98.2 |
| 2-3 | 1-3 | 98.1 |
| 2-4 | 1-4 | 98.3 |
| 2-5 | 1-5 | 98.4 |
| 2-6 | 1-6 | 98.3 |
| 2-7 | 1-7 | 98.4 |
| 2-8 | 1-8 | 98.4 |
| 2-9 | 1-9 | 98.5 |
| 2-10 | 1-10 | 98.4 |
| 2-11 | 1-11 | 98.5 |
| 2-12 | 1-12 | 98.4 |

TABLE 3-continued

| Use Example | Polymer | Recontamination inhibitability (%) |
|---|---|---|
| 2-13 | 1-13 | 98.7 |
| 2-14 | 1-14 | 98.4 |
| 2-15 | 1-15 | 98.6 |

As is evident from Table 3, the polymer obtained by the production process according to the present invention has excellent recontamination inhibitability.

Hereinafter, the detergencies of the polymers according to the present invention, as obtained in Examples 1—1 to 1–15, were measured by the below-mentioned process so that the polymers might further be evaluated on the use thereof as detergent compositions. The results are collectively shown in Table 4.

Detergency (1) Cotton cloth according to JIS-L0803, obtained from the Japanese Laundry Research Association, was cut into pieces of 5 cm×5 cm to prepare white cloth. In addition artificially contaminated wet cloth was also obtained from the Japanese Laundry Research Association. The whiteness degrees of these white cloth and contaminated cloth were beforehand measured by the reflectance with a calorimetric color difference meter, ND-1001DP model, made by Nippon Denshoku Kogyo Co., Ltd.

(2) Hard water was prepared by adding pure water to 0.294 g of calcium chloride dihydrate to adjust the total weight to 5,000 g. This hard water and tap water for rinsing were immersed into a thermostat of 25° C.

(3) A Terg-O-Tometer was set to 25° C., and then 500 ml of the above hard water and 5 pieces of the contaminated cloth and 5 pieces of the white cloth were placed into a pot of the Terg-O-Tometer and then stirred at 100 rpm for 1 minute.

(4) Into the above pot, 2 g of 5% aqueous sodium carbonate solution, 2 g of 5% aqueous LAS solution, 0.075 g of zeolite and 10 g of aqueous polymer solution of 1% in terms of solid content were added, and then the contents of the pot were stirred at 100 rpm for 10 minutes.

(5) Water was drained off from the white cloth and the contaminated cloth by hand, and then 500 ml of the tap water as adjusted to 25° C. in the above way was placed into the pot, and then its contents were stirred at 100 rpm for 2 minutes. This step was twice carried out.

(6) The white cloth and the contaminated cloth were dried while their wrinkles were ironed out with the white cloth and the contaminated cloth respectively covered by other cloth, and then the whiteness degrees of the dried white cloth and the dried contaminated cloth were measured by the reflectance with the above calorimetric color difference meter again.

(7) The detergency percentage was calculated from the above measurement results in accordance with the following equation (Equation 3):

Detergency percentage (%)={(whiteness degree of contaminated cloth after washing)−(whiteness degree of contaminated cloth before washing)}/{(whiteness degree of original white cloth)−(whiteness degree of contaminated cloth before washing)}×100    (Equation 3)

TABLE 4

| Use Example | Polymer | Detergency (%) |
|---|---|---|
| 3-1 | 1-1 | 35.8 |
| 3-2 | 1-2 | 35.3 |
| 3-3 | 1-3 | 34.7 |
| 3-4 | 1-4 | 34.5 |
| 3-5 | 1-5 | 34.2 |
| 3-6 | 1-6 | 34.4 |
| 3-7 | 1-7 | 35.1 |
| 3-8 | 1-8 | 36.3 |
| 3-9 | 1-9 | 36.0 |
| 3-10 | 1-10 | 36.2 |
| 3-11 | 1-11 | 36.5 |
| 3-12 | 1-12 | 36.0 |
| 3-13 | 1-13 | 35.8 |
| 3-14 | 1-14 | 36.1 |
| 3-15 | 1-15 | 36.3 |

As is evident from Table 4, the polymer obtained by the production process according to the present invention has excellent detergency.

From the total results of Tables 3 and 4, it is evident that the detergent composition according to the present invention is very excellent.

Hereinafter, the calcium carbonate scale inhibitability of the polymers according to the present invention, as obtained in Examples 1—1 to 1–15, were measured by the below-mentioned process so that the polymers might be evaluated on the use thereof as water-treating agents. The results are collectively shown in Table 5.

Calcium Carbonate Scale Inhibitability (1) First of all, a 1.56% aqueous calcium chloride dihydrate solution, a 3.0% aqueous sodium hydrogencarbonate solution and an aqueous polymer solution of 0.2% in terms of solid content were prepared.

(2) Next, 170 g of pure water was placed into a glass bottle of 225 ml in capacity. Then, 10 g of the 1.56% aqueous calcium chloride dihydrate solution and 3 g of the aqueous polymer solution of 0.2% in terms of solid content were mixed into the pure water, and further thereto 10 g of the aqueous sodium hydrogencarbonate solution and 7 g of sodium chloride were added, with the result that the entire contents of the bottle amounted to 200 g.

(3) The bottle containing the resultant aqueous solution as supersaturated with calcium carbonate 530 ppm was dosed up tight, and then this solution was heated at 70° C.

(4) Then, after cooling, the resultant precipitate was filtered off with a membrane filter of 0.1 $\mu$m, and the resultant filtrate was analyzed in accordance with JIS-K0101.

(5) The calcium carbonate scale inhibition rate (%) was calculated from the above measurement results in accordance with the following equation (Equation 4):

Scale inhibition rate(%)={(C−B)/(A−B)}×100    (Equation 4)

wherein:

A is the concentration (ppm) of calcium which was dissolved in the solution before the test;

B is a concentration (ppm) of calcium in a filtrate resultant from a solution to which the polymer was not added in the test; and C is a concentration (ppm) of calcium in a filtrate resultant from a solution to which the polymer was added in the test.

TABLE 5

| Use Example | Polymer | Scale inhibition rate (%) |
|---|---|---|
| 4-1 | 1-1 | 66.8 |
| 4-2 | 1-2 | 66.6 |
| 4-3 | 1-3 | 65.9 |
| 4-4 | 1-4 | 66.8 |
| 4-5 | 1-5 | 66.0 |
| 4-6 | 1-6 | 66.6 |
| 4-7 | 1-7 | 70.1 |
| 4-8 | 1-8 | 67.2 |
| 4-9 | 1-9 | 66.9 |
| 4-10 | 1-10 | 67.3 |
| 4-11 | 1-11 | 67.0 |
| 4-12 | 1-12 | 66.8 |
| 4-13 | 1-13 | 66.0 |
| 4-14 | 1-14 | 67.0 |
| 4-15 | 1-15 | 67.2 |

As is evident from Table 5, the polymer obtained by the production process according to the present invention has very excellent scale inhibitability and therefore has been found to effectively be utilizable also as a water-treating agent.

Hereinafter, the viscosities of inorganic-pigment dispersions were measured with a B-type viscosimeter by the below-mentioned process so that the polymers according to the present invention, as obtained in Examples 1—1 to 1–15, might be evaluated on the use thereof as pigment dispersants. The results are collectively shown in Table 6.

Preparation of Dispersion and Measurement of its Viscosity (1) First of all, a 10 weight % aqueous polymer solution was prepared.

(2) Next, 150 g of pure water was placed into a plastic vessel of 600 ml, and thereto 70 g of light calcium carbonate, 105 g of heavy calcium carbonate and 175 g of Alphacoat were gradually added in this order while the contents of the vessel were stirred at 1,000 rpm with TK Homomixer (made by Tokushu Kika Kogyo Co., Ltd.; the Labodisper MR-L model was used as its stirring portion). If the pigment became difficult to disperse during its addition, the above 10 weight % aqueous polymer solution was fitly added.

(3) After all the pigments had been added, the above 10 weight % aqueous polymer solution was added to adjust the total weight to 10.5 g, and the contents of the vessel were stirred at 3,000 rpm for another 15 minutes.

(4) After being stirred, the resultant mixture was placed in a thermostat of 25° C. for 30 minutes. Then, the viscosity of the mixture was measured with the B-type viscosimeter by rotating its rotor for 3 minutes.

TABLE 6

| Use Example | Polymer | Inorganic-pigment dispersibility (mPa · s) |
|---|---|---|
| 5-1 | 1-1 | 3,000 |
| 5-2 | 1-2 | 2,100 |
| 5-3 | 1-3 | 2,200 |
| 5-4 | 1-4 | 2,300 |
| 5-5 | 1-5 | 2,200 |
| 5-6 | 1-6 | 2,300 |
| 5-7 | 1-7 | 2,300 |
| 5-8 | 1-8 | 2,200 |
| 5-9 | 1-9 | 2,100 |
| 5-10 | 1-10 | 2,300 |
| 5-11 | 1-11 | 2,500 |
| 5-12 | 1-12 | 2,700 |
| 5-13 | 1-13 | 9,600 |
| 5-14 | 1-14 | 2,300 |
| 5-15 | 1-15 | 2,100 |

As is evident from Table 6, the polymer obtained by the production process according to the present invention has very excellent inorganic-pigment dispersibility and therefore has been found to effectively be utilizable also as a pigment dispersant.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for a low-molecular (meth)acrylic acid (salt)-based polymer, which comprises the step of polymerizing an aqueous solution of at least one monomer component of a high concentration in the presence of an alkaline substance under conditions where polymerization catalysts are used, wherein: 100 to 95 mol % of the at least one monomer component is a monoethylenically unsaturated monocarboxylic acid (salt) monomer (a) having 3 to 6 carbon atoms; and 0 to 5 mol % of the at least one monomer component is a monoethylenically unsaturated monomer (b) copolymerizable with the monomer (a) (wherein the total of (a) and (b) is 100 mol %); and wherein: a persulfate salt and hydrogen peroxide are used together as the polymerization catalysts; and the entirety of the alkaline substance as used is set not to be more than 99 mol % of the amount which is necessary for neutralizing all acid groups of the at least one monomer component; the monomer (a) is added to the reaction system by substantially continuously drop-wise adding not less than 70 weight % of the entirety of said monomer (a), and the monomer (b) is added to the reaction system by substantially continuously drop-wise adding not less than 70 weight % of the entirety of said monomer (b), and the dropwise addition of the hydrogen peroxide is completed at the latest 10 minutes earlier than the completion time of the dropwise addition of the at least one monomer component.

2. A production process according to claim 1, wherein: when the weight-average molecular weight of the resultant polymer is less than 20,000, the final concentration of the resultant polymer is not less than a value given by multiplying the weight-average molecular weight of the resultant polymer by 0.002; and when the weight-average molecular weight of the resultant polymer is not less than 20,000, the final concentration of the resultant polymer is not less than a square root of a value given by multiplying the weight-average molecular weight of the resultant polymer by 0.08.

3. A production process according to claim 1, wherein the final concentration of the resultant polymer is not less than 30 weight %.

4. A production process according to claim 1, wherein the dispersion degree of the resultant polymer is in the range of 1.5 to 5.0, wherein the dispersion degree is a quotient given by dividing the weight-average molecular weight by the number-average molecular weight.

5. A production process according to claim 1, wherein the ratio (by weight) between the persulfate salt and the hydrogen peroxide which are used together as the polymerization catalysts is in the range of hydrogen peroxide persulfate salt=1:0.1–5.0.

6. A low-molecular (meth)acrylic acid (salt)-based polymer, which is obtained by the production process as recited in claim 1.

7. A low-molecular (meth)acrylic acid (salt)-based polymer, which is obtained by a process including the step of polymerizing at least one monomer component of which 100 to 95 mol % is a monoethylenically unsaturated monocarboxylic acid (salt) monomer (a) having 3 to 6 carbon atoms, and of which 0 to 5 mol % is a monoethylenically unsaturated monomer (b) copolymerizable with the monomer (a) (wherein the total of (a) and (b) is 100 mol %), wherein: the polymer has a weight-average molecular weight of 1,000 to 30,000, a dispersion degree of 1.5 to 5.0 and a clay dispersibility in high-hardness water of 0.47 to 0.60; and a 40 weight % aqueous solution of the polymer has a hydrogen peroxide content of 5 to 500 ppm and a hazen value of not more than 300.

8. A detergent composition, which comprises the low-molecular (meth)acrylic acid (salt)-based polymer as recited in claim 6.

9. A detergent composition, which comprises the low-molecular (meth)acrylic acid (salt)-based polymer as recited in claim 7.

10. A water-treating agent, which comprises the low-molecular (meth)acrylic acid (salt)-based polymer as recited in claim 6.

11. A water-treating agent, which comprises the low-molecular (meth)acrylic acid (salt)-based polymer as recited in claim 7.

12. A low-molecular (meth)acrylic acid (salt)-based polymer according to claim 7, wherein said process comprises the step of adding said monomer (a) to the reaction system by a substantially continuously drop-wise addition of not less than 70 weight % of the entirety of said monomer (a), and the step of adding said monomer (b) to the reaction system by substantially continuously drop-wise addition of not less than 70 weight % of the entirety of said monomer (b).

13. A production process according to claim 1, wherein said (meth)acrylic acid (salt)-based polymer has a clay dispersibility in high-hardness water of 0.47 to 0.60.

14. A production process according to claim 13, wherein said clay dispersibility is measured in high-hardness water having a calcium concentration of 200 ppm in terms of calcium carbonate.

15. A low-molecular (meth)acrylic acid (salt)-based polymer according to claim 7, wherein said clay dispersibility is measured in high-hardness water having a calcium concentration of 200 ppm in terms of calcium carbonate.

* * * * *